(12) United States Patent
Zhang et al.

(10) Patent No.: US 6,973,231 B2
(45) Date of Patent: *Dec. 6, 2005

(54) WAVEGUIDE GRATING-BASED WAVELENGTH SELECTIVE SWITCH ACTUATED BY THERMAL MECHANISM

(75) Inventors: Jianjun Zhang, Cupertino, CA (US); Peiching Ling, San Jose, CA (US); Jinliang Chen, Saratoga, CA (US); Ming Xu, San Jose, CA (US)

(73) Assignee: International Optics Communications Corporation, Sunnyvale, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 10/758,661

(22) Filed: Jan. 15, 2004

(65) Prior Publication Data

US 2004/0146240 A1    Jul. 29, 2004

Related U.S. Application Data

(63) Continuation-in-part of application No. 10/177,632, filed on Jun. 19, 2002, now Pat. No. 6,842,563.

(60) Provisional application No. 60/348,927, filed on Oct. 22, 2001, now abandoned.

(51) Int. Cl.[7] ............................................. G02B 6/28
(52) U.S. Cl. .......................................... 385/24; 385/15
(58) Field of Search .............................. 385/2, 4, 8, 10, 385/14, 15, 16, 17, 37, 40, 130, 131, 901, 385/94, 37.1, 7, 24; 359/161, 179, 160, 130; 372/6

(56) References Cited

U.S. PATENT DOCUMENTS 3,918,794 A    11/1975   Milton
4,013,000 A    3/1977    Kogelnik
4,240,693 A    12/1980   Johnson et al.
5,422,611 A    6/1995    Kashima et al.
5,444,802 A    8/1995    Shibata et al.
5,652,817 A    7/1997    Brinkman et al.
5,664,032 A    9/1997    Bischel et al.
5,703,710 A    12/1997   Brinkman et al.
5,778,119 A    7/1998    Farries
5,802,222 A    9/1998    Rasch et al.
5,805,751 A    9/1998    Kewitsch et al.
5,862,276 A    1/1999    Karras
5,875,272 A    2/1999    Kewitsch et al.
5,915,051 A    6/1999    Damask et al.
5,943,454 A    8/1999    Aksyuk et al.

(Continued)

FOREIGN PATENT DOCUMENTS

JP    2151842    6/1990

(Continued)

OTHER PUBLICATIONS

Harry J. R. Dutton, "Characteristics on In-Fibre Bragg Gratings", Understanding Optical Communications, Jan. 15, 1999, pp. 268-271, Prentice Hall PTR, Upper Saddle River, New Jersey, US.

(Continued)

*Primary Examiner*—Karl D. Frech
(74) *Attorney, Agent, or Firm*—Perkins Coie LLP

(57)    ABSTRACT

A wavelength selective switch. The switch comprises an input waveguide for carrying an optical signal having a wavelength $\lambda_i$. Also included is an output waveguide having a Bragg grating adapted for coupling the wavelength $\lambda_i$ into the output waveguide in a coupling zone. Finally, provided is a heater element that can selectively provide thermal energy to the coupling zone such that the Bragg grating does not couple the wavelength $\lambda_i$.

17 Claims, 8 Drawing Sheets

U.S. PATENT DOCUMENTS

| | | | |
|---|---|---|---|
| 6,057,520 | A | 5/2000 | Goodwin-Johansson |
| 6,061,484 | A | 5/2000 | Jones et al. |
| 6,212,314 | B1 | 4/2001 | Ford |
| 6,289,699 | B1 | 9/2001 | Kewitsch et al. |
| 6,298,180 | B1 | 10/2001 | Ho |
| 6,356,679 | B1 | 3/2002 | Kapany |
| 6,360,038 | B1 | 3/2002 | Grubsky |
| 6,389,189 | B1 | 5/2002 | Edwards et al. |
| 6,404,943 | B1 | 6/2002 | Wang |
| 6,438,277 | B1 * | 8/2002 | Eggleton et al. .............. 385/1 |
| 6,501,874 | B1 | 12/2002 | Frolov et al. |
| 6,522,795 | B1 | 2/2003 | Jordan et al. |
| 6,567,573 | B1 | 5/2003 | Domash et al. |
| 6,567,574 | B1 | 5/2003 | Ma et al. |
| 6,611,366 | B2 | 8/2003 | Islam et al. |
| 6,658,176 | B2 | 12/2003 | Amantea |
| 6,842,563 | B2 * | 1/2005 | Zhang et al. ................ 385/24 |
| 2001/0046352 | A1 | 11/2001 | Ohta et al. |
| 2002/0024717 | A1 | 2/2002 | Nakamura |
| 2002/0063944 | A1 | 5/2002 | Kim et al. |
| 2002/0150330 | A1 | 10/2002 | Kopp et al. |
| 2003/0194179 | A1 | 10/2003 | Rumpf et al. |
| 2003/0219197 | A1 | 11/2003 | Kawamoto |

FOREIGN PATENT DOCUMENTS

| | | |
|---|---|---|
| JP | 2001324734 | 11/2001 |
| JP | 2003195200 | 7/2003 |
| WO | WO 02/23244 | 3/2002 |

OTHER PUBLICATIONS

B.J. Eggleton, et al., "Integrated Tunable Fiber Gratings for Dispersion Management in High-Bit Rate Systems", Journal of Lightwave Technology, Oct. 2000, pp. 1418-1432, vol. 18, No. 10, IEEE, New York, NY, US.

Mark Barratt, "Dispersion Management for the Next Generation Optical Network", Communications Design Conference, Oct. 2001, pp. 1-4, LaserComm Inc., Plano TX, US.

* cited by examiner

WAVEGUIDE GRATING-BASED WAVELENGTH SELECTIVE SWITCH ACTUATED BY THERMAL MECHANISM

CROSS-REFERENCE TO RELATED APPLICATION

This is a continuation-in-part of, and claims priority under 35 U.S.C. §120 to, U.S. patent application Ser. No. 10/177,632 filed Jun. 19, 2002, now U.S. Pat. No. 6,842,563 which claims priority to U.S. Provisional Patent Application Ser. No. 60/348,927 filed Oct. 22, 2001, now abandoned, each of which is hereby incorporated by reference in their entirety.

BACKGROUND OF THE INVENTION

1. Field of the Invention

This invention relates generally to waveguide grating-based switches, and more particularly, to a method and apparatus for thermally activating the switch.

2. Description of the Related Art

Due to the extremely wide transmission bandwidth provided by optical fiber, all-optical fiber networks are increasingly being used as backbones for global communication systems. To fully exploit the fiber bandwidth in such networks, wavelength-division multiplexing (WDM) and wavelength-division demultiplexing (WDD) technologies are employed so that an individual optical fiber can transmit several independent optical streams simultaneously, with the streams being distinguished by their center wavelengths. Since these optical streams are coupled and decoupled based on wavelength, wavelength selective devices are essential components in WDM communication networks.

In the past, wavelength selective devices performed the adding, dropping and cross-connecting of individual wavelengths by first converting the optical signal into the electrical domain. However, the development of all-optical WDM communication systems has necessitated the need for all-optical wavelength selective devices. It is desirable for such devices to exhibit the properties of low insertion loss, insensitivity to polarization, good spectral selectivity, and ease of manufacturing.

One technology for wavelength selection is a Bragg grating-based switch. As disclosed in our co-pending U.S. patent application Ser. No. 10/177,632, one type of Bragg grating-based switches are activated (and deactivated) using micro-electromechanical switch (MEMS) techniques. In other words, waveguides are physically displaced in order to effectuate coupling. However, the use of MEMS requires relatively complex manufacturing techniques.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention. Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
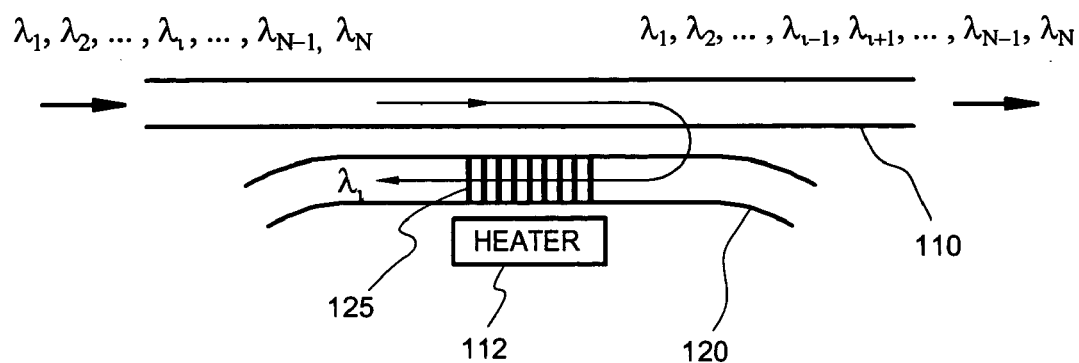
FIG. 1 is a schematic illustration of a wavelength selective switch formed in accordance with the present invention.

FIG. 1 is a schematic diagram of a wavelength-selective waveguide 120 relative to a multi-channel bus waveguide 110. A multiplexed optical signal is transmitted in a bus waveguide 110 over N multiplexed wavelengths $\lambda_1$, $\lambda_2$, $\lambda_3$, . . . , $\lambda_N$ where N is a positive integer. A heater 112 is disposed proximate to a Bragg grating 125 formed on the waveguide 120. An optical signal with a central wavelength $\lambda_i$ particular to the Bragg gratings 125 disposed on the waveguide 120 is guided into the wavelength selective waveguide 120.

The remainder optical signal of the wavelengths $\lambda_i$, $\lambda_2$, . . . , $\lambda_{i+1}$, $\lambda_{i+1}$, . . . , $\lambda_N$ is not affected and continues to transmit over the waveguide 110. The Bragg gratings 125 have a specific pitch or periodicity for reflecting the optical signal of the selected wavelength $\lambda_i$ onto the waveguide 120.

The heater 112 serves as the mechanism by which the Bragg wavelength can be selected for coupling into the waveguide 120. The heater 112 serves to shift the Bragg wavelength of the Bragg grating 125. The heater 112 when properly controlled can locally heat the coupling zone of the two waveguides 110 and 120 to change the modal indices of the first mode and the second mode in the direct coupler formed by the waveguides 110 and 120. It should be noted that while the heater 112 is shown adjacent to the Bragg grating 125, it is the entire coupling zone of the waveguides 110 and 120 that should be heated and in actual implementations, the heater 112 may substantially surround the waveguides 110 and 120 in the region of the Bragg grating 125. [Is this correct? Yes At first I thought that only the Bragg grating 125 needed to be heated and that changed the periodicity, but now I am thinking that it is the actual waveguide material that needs to be heated? Which is correct? The latter is correct.] Further, it should be noted that the present invention is implemented using a heater, but in an alternative embodiment, a cooling mechanism may be substituted. As will be seen in greater detail below, the operative action is the change in temperature relative to a nominal temperature. The change in temperature causes a shift in the Bragg wavelength. Thus, a cooling mechanism may also be used.

The following equation generally describes the relationship between the Bragg wavelength, modal indices, and grating period:

$$\Lambda_{Bragg} = (n_1 + n_2) * \Lambda$$

where $n_1$ and $n_2$ are the modal indices of the first mode and second mode of the direct coupler formed by the two waveguides 110 and 120, $\Lambda$ is the grating period of the Bragg grating 125, and $\lambda_{Bragg}$ is the Bragg wavelength.

Further, it has been found that the general relationship between temperature change and modal index change is as follows:

$$\Delta n / \Delta T \approx 1.2 \times 10^{-5}$$

where $\Delta n$ is the modal index change and $\Delta T$ is the temperature change in degrees Celsius. Thus, it can be seen that by appropriately changing the temperature of the waveguides 110 and 120 in the coupling region, the Bragg wavelength can be controlled.

Returning to FIG. 1, as noted above, when the heater 112 is not performing heating, the Bragg grating 125 and waveguides 110 and 120 couple wavelength $\lambda_i$ into the waveguide 120. This is referred to as the "ON" state.

However, when a temperature change induced by the heater 112 is performed, the Bragg wavelength $\lambda_{bg}$ is shifted and no longer equals $\lambda_i$. Thus, wavelength $\lambda_i$ is not selected for coupling. If the Bragg wavelength shift due to heating is large enough, none of the wavelengths of the input signal will be coupled into waveguide 120. This is referred to as the "OFF" state.

Furthermore, the "ON" and "OFF" states may be reversed in some embodiments. For example, when the heater 112 is off the Bragg grating may be designed to not couple. In this design, only when the heater 112 is on, will the Bragg grating select and couple the wavelength $\lambda_i$.

Figure 2:
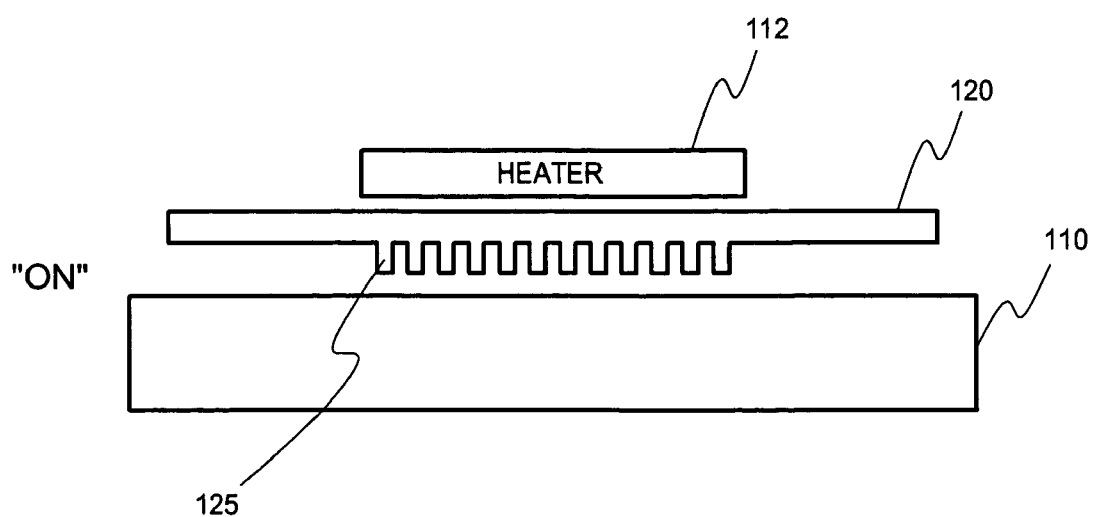
FIGS. 2–3 are cross sectional views of a wavelength selective switch formed in accordance with the present invention.
Figure 3:
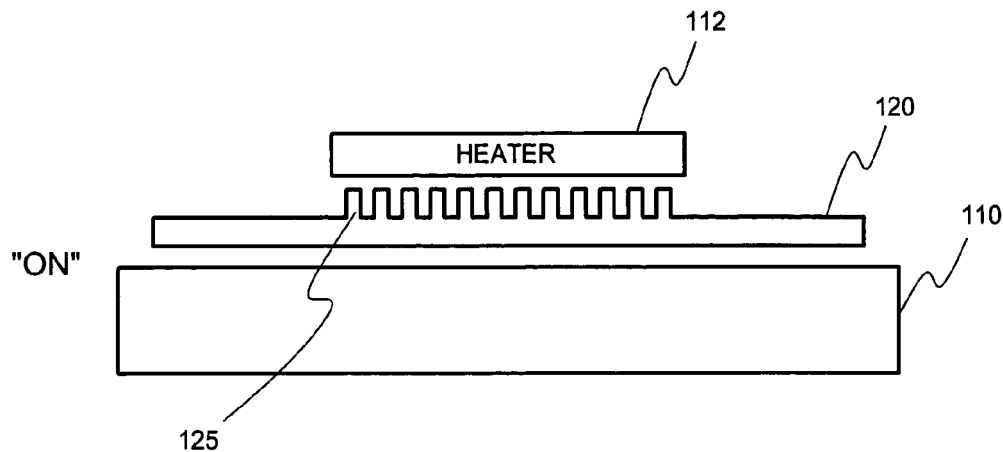

FIG. 2 illustrates the detailed configuration of the Bragg grating 125 formed on the wavelength selective waveguide 120. The pitch between the gratings 125 defines a selected nominal wavelength $\lambda_i$ that will be reflected onto the waveguide 120. Furthermore, as that shown in FIG. 3, the Bragg grating 125 may be formed on a surface of the waveguide 120 opposite the input waveguide 110.

Figure 4:
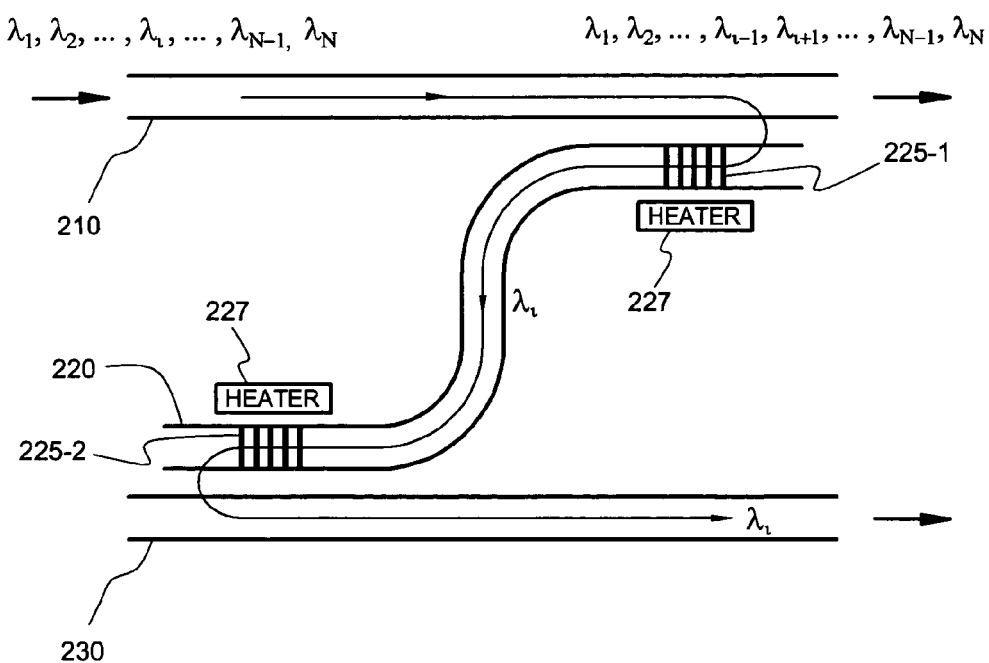
FIGS. 4–6 are schematic views for showing the coupling configurations of a wavelength-selective waveguide coupled between a bus waveguide and an outbound waveguide.

FIG. 4 shows a wavelength selective waveguide 220 coupled between a bus waveguide 210 and an output waveguide 230. The wavelength selective waveguide 220 is also referred to as a bridge waveguide. A multiplexed optical signal is transmitted in a bus waveguide 210 over N multiplexed wavelengths $\lambda_1, \lambda_2, \lambda_3, \ldots, \lambda_n$, where N is a positive integer. The wavelength selective waveguide 220 has a first Bragg grating disposed on a first "on-ramp segment" 225-1 for coupling to the bus waveguide 210. An optical signal with a central wavelength $\lambda_i$ particular to the Bragg grating disposed on the bridge waveguide 220 is guided through the first ramp segment 225-1 to be reflected into the wavelength selective waveguide 220. The remainder optical signal of the wavelengths $\lambda_1, \lambda_2, \ldots, \lambda_{i-1}, \lambda_{i+1}, \ldots, \lambda_N$ is not affected and continues to propagate over the waveguide 210.

The Bragg gratings have a specific pitch for reflecting the optical signal of the selected wavelength $\lambda_i$ onto the wavelength selective waveguide 220. The Bridge waveguide 220 further has a second Bragg grating as an off-ramp segment 225-2 coupled to second waveguide 230. The second Bragg grating has a same pitch as the first Bragg grating. The selected wavelength $\lambda_i$ is guided through the off-ramp segment 225-2 to be reflected and coupled into the outbound waveguide 230. The waveguide 220 can be an optical fiber, waveguide or other optical transmission medium connected between the on-ramp segment 225-1 and the off-ramp segment 225-2.

Furthermore, in accordance with the present invention, a heater 227 is placed proximate to the on-ramp segment 225-1 and the off-ramp segment 225-2. The heater 227 is operative to heat coupling zones of the on-ramp segment 225-1 and off-ramp segment 225-2 (and associated portions of the input and output waveguides 210 and 230) such that the Bragg wavelength is shifted. This allows the selection of the particular propagating wavelength to be switched, if any. Thus, one or none of the wavelengths $\lambda_1, \lambda_2, \lambda_3, \ldots, \lambda_n$ may be selectively switched.

Figure 5:
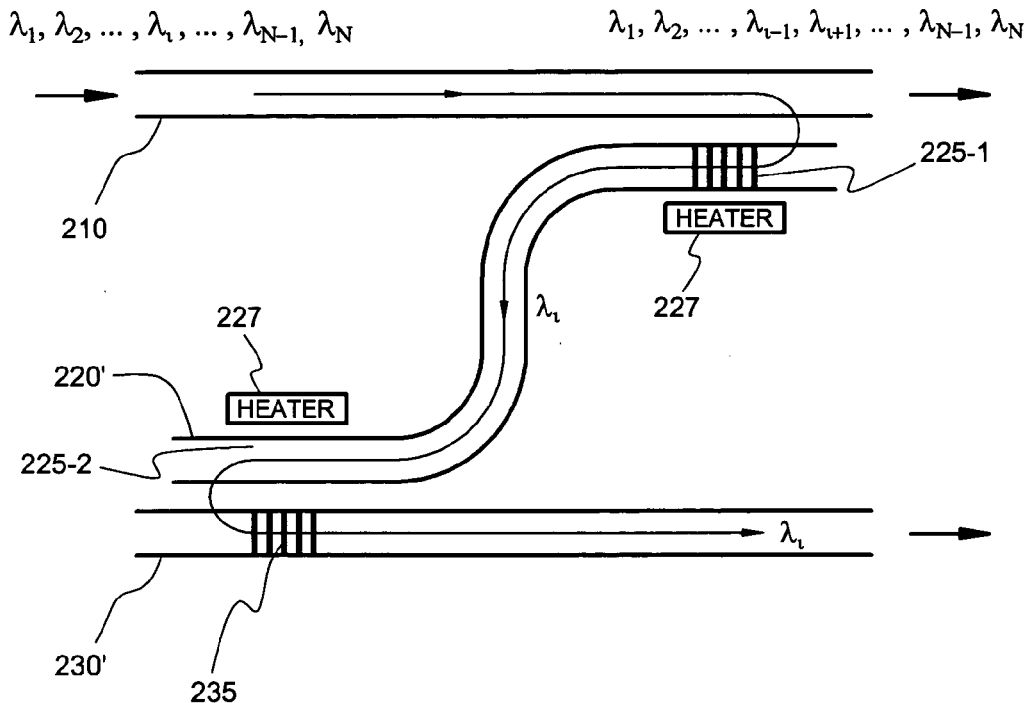

FIG. 5 shows another wavelength selective waveguide 220' coupled between a bus waveguide 210 and an output waveguide 230'. A multiplexed optical signal is transmitted in a bus waveguide 210 over N multiplexed wavelengths $\lambda_1, \lambda_2, \lambda_3, \ldots, \lambda_n$, where N is a positive integer. The wavelength selective waveguide 220' has a first Bragg grating disposed on a first "on-ramp segment" 225-1 for coupling to the bus waveguide 210. An optical signal with a central wavelength $\lambda_i$ particular to the Bragg grating 225-1 disposed on the waveguide 220' is guided through the first ramp segment 225-1 to be reflected into the wavelength selective waveguide 220'.

The wavelength selective waveguide 220' further has an off-ramp segment 225-2' coupled to an outbound waveguide 230' near a section 235 of the outbound waveguide 230. The section 235 on the outbound waveguide 230' has a second Bragg grating having a same pitch as the first Bragg grating. The waveguide 220 can be an optical fiber, waveguide or other optical transmission medium connected between the on-ramp segment 225-1 and the off-ramp segment 225-2'.

Furthermore, in accordance with the present invention, a heater 227 is placed proximate to the on-ramp segment 225-1' and the off-ramp segment 225-2'. The heater 227 is operative to heat coupling zones of the on-ramp segment 225-1' and off-ramp segment 225-2' (and associated portions of the input and output waveguides 210 and 230' such that the Bragg wavelength is shifted. This allows the selection of the particular propagating wavelength to be switched, if any. Thus, one or none of the wavelengths $\lambda_1, \lambda_2, \lambda_3, \ldots, \lambda_n$ may be selectively switched.

Figure 6:
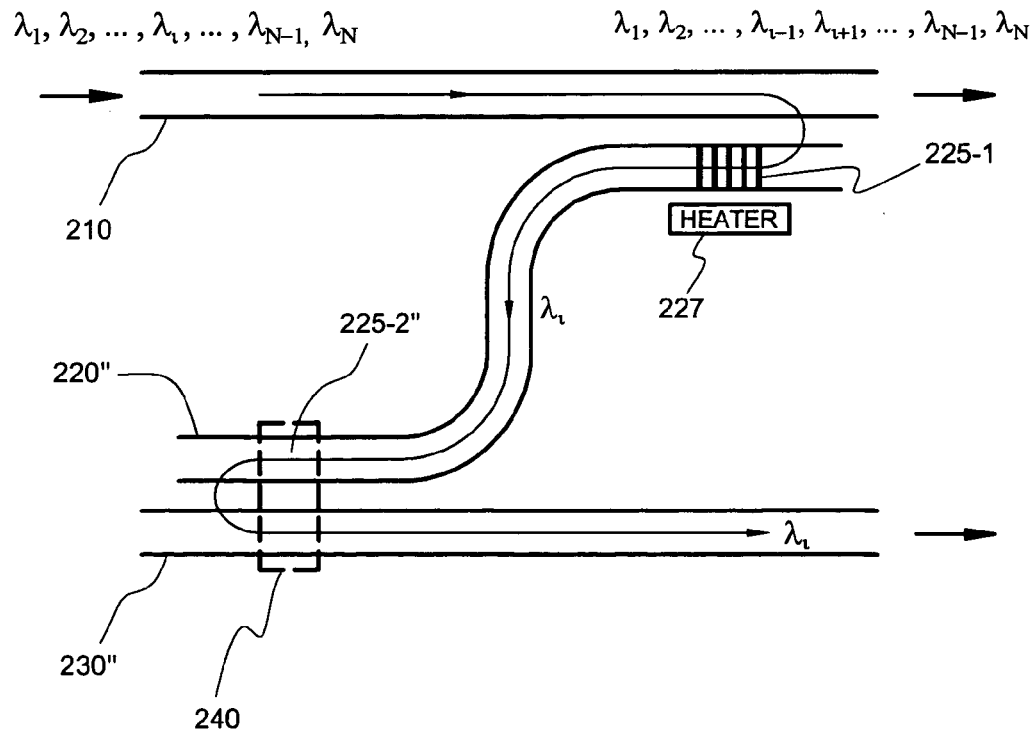

FIG. 6 shows another wavelength selective waveguide 220" coupled between a bus waveguide 210 and an output waveguide 230". A multiplexed optical signal is transmitted in a bus waveguide 210 over N multiplexed wavelengths $\lambda_1, \lambda_2, \lambda_3, \ldots, \lambda_n$, where N is a positive integer. The wavelength selective waveguide 220" has a first Bragg grating disposed on a first "on-ramp segment" 225-1 for coupling to the bus waveguide 210. An optical signal with a central wavelength $\lambda_i$ particular to the Bragg grating 225-1 disposed on the waveguide 220" is guided through the first ramp segment 225-1 to be reflected into the wavelength selective waveguide 220".

The wavelength selective waveguide 220" further has an off-ramp segment 225-2" coupled to an outbound waveguide 230". The Bragg gratings 225-1 have a specific pitch for reflecting the optical signal of the selected wavelength $\lambda_i$ into the wavelength selective waveguide 220". The wavelength selective waveguide 220" further has an off-ramp segment 225-2" coupled to an outbound waveguide 230" through a coupler 240. The waveguide 220 can be an optical fiber, waveguide or other optical transmission medium connected between the on-ramp segment 225-1 and the off-ramp segment 225-2".

Furthermore, in accordance with the present invention, a heater 227 is placed proximate to the on-ramp segment 225-1. The heater 227 is operative to heat a coupling zone of the on-ramp segment 225-1' (and associated portion of the input waveguide 210) such that the Bragg wavelength is shifted. This allows the selection of the particular propagating wavelength to be switched, if any. Thus, one or none of the wavelengths $\lambda_1, \lambda_2, \lambda_3, \ldots, \lambda_n$ may be selectively switched.

Figure 7:
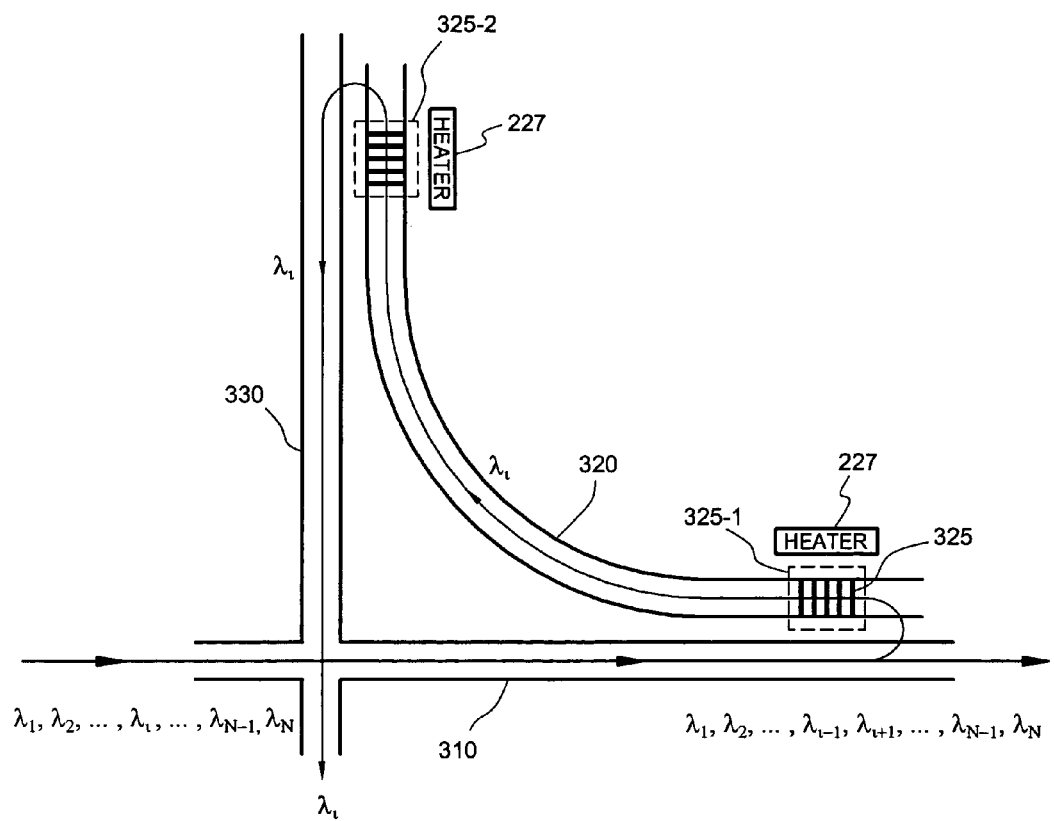
FIGS. 7–11 are functional diagrams for showing a wavelength selective waveguide coupled between the intersecting waveguides for switching and re-directing optical transmission of a selected wavelength.

FIG. 7 shows a wavelength selective waveguide 320 coupled between a bus waveguide 310 and an intersecting waveguide 330. The wavelength selective waveguide 320 is also referred to as a bridge waveguide switch. A multiplexed optical signal is transmitted in a bus waveguide 310 over N multiplexed wavelengths $\lambda_1, \lambda_2, \lambda_3, \ldots, \lambda_n$, where N is a positive integer. The wavelength selective waveguide 320 has a first Bragg grating disposed on a first "on-ramp segment" 325-1 for coupling to the bus waveguide 310. An optical signal with a central wavelength $\lambda_i$ particular to the Bragg grating 325 disposed on the waveguide 320 is guided through the first ramp segment 325-1 to be reflected into the wavelength selective waveguide 320.

The remainder optical signal of the wavelengths $\lambda_1, \lambda_2, \ldots, \lambda_{i-1}, \lambda_{i+1}, \ldots, \lambda_N$ is not affected and continues to propagate over the waveguide 310. The Bragg gratings 325 have a specific pitch for reflecting the optical signal of the selected wavelength $\lambda_i$ into the wavelength selective waveguide 320. The wavelength selective waveguide 320 further has a second Bragg grating as an off-ramp segment 325-2 coupled to an outbound waveguide 330. The waveguide 320 can be an optical fiber, waveguide or other optical transmission medium connected between the on-ramp segment and the off-ramp segment 325-2.

Furthermore, in accordance with the present invention, a heater 227 is placed proximate to the on-ramp segment 325-1. The heater 227 is operative to heat a coupling zone of the on-ramp segment 325-1 (and associated portion of the input waveguide 310) such that the Bragg wavelength is shifted. A heater 227 is also placed proximate to the off-ramp segment 325-2. The heater 227 is operative to heat a coupling zone of the off-ramp segment 325-2 (and associated portion of the intersecting waveguide 330) such that the Bragg wavelength is shifted. This allows the selection of the particular propagating wavelength to be switched, if any. Thus, one or none of the wavelengths $\lambda_1, \lambda_2, \lambda_3, \ldots, \lambda_n$ may be selectively switched.

Figure 8:
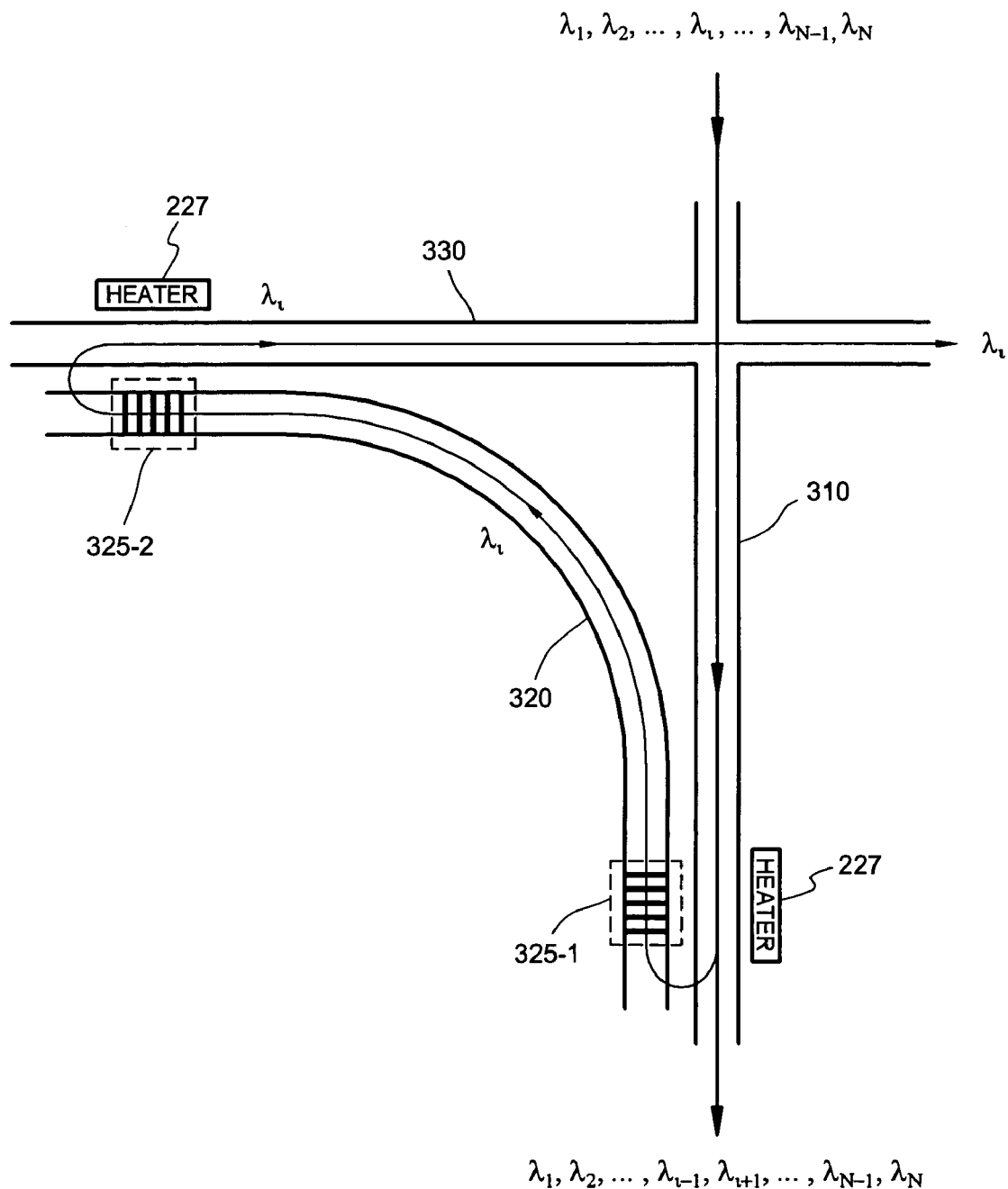
Figure 9:
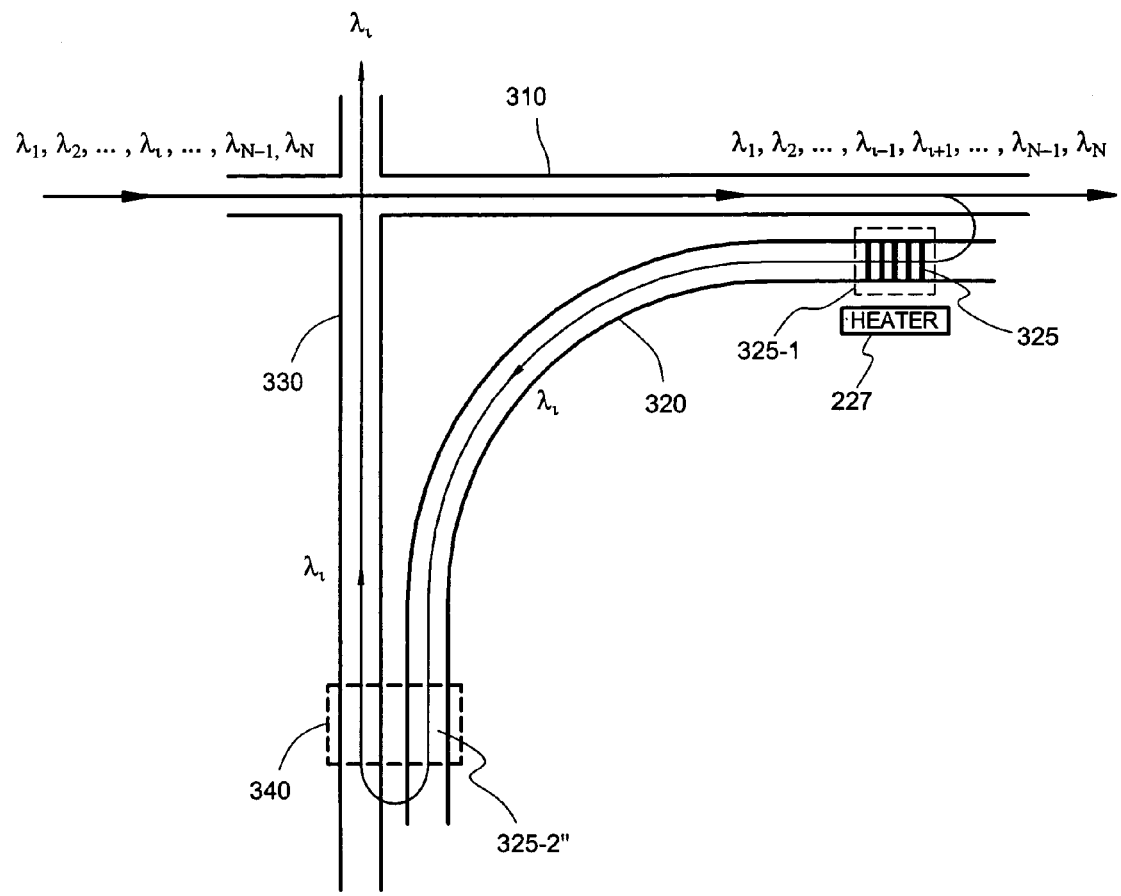
Figure 10:
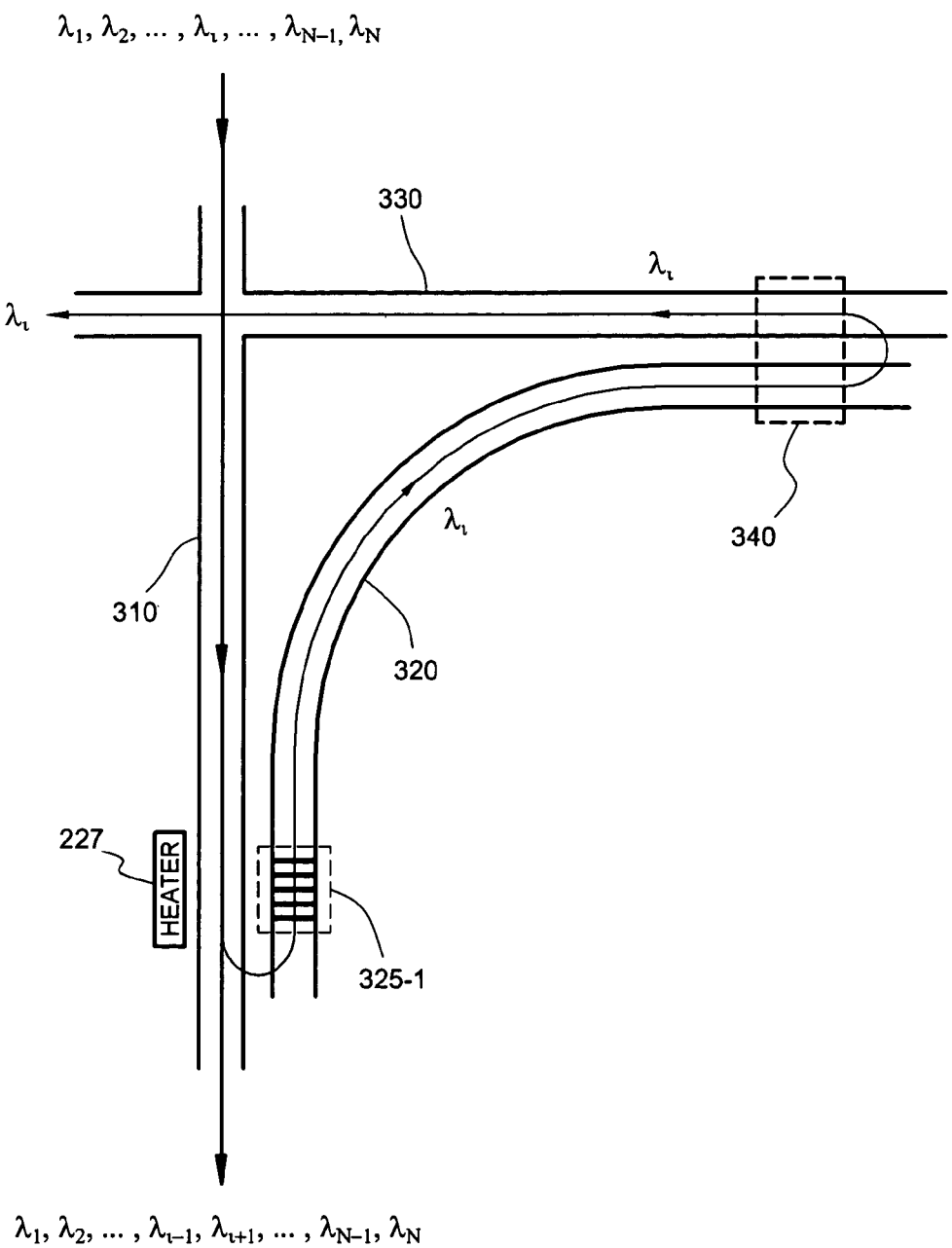

FIG. 8 is another preferred embodiment similar to that shown in FIG. 7 with the bus waveguide 310 disposed in a vertical direction and an interesting outbound waveguide 330 disposed along a horizontal direction. FIG. 9 is another preferred embodiment similar to that shown in FIG. 7 with the wavelength selective waveguide 320 coupled to the outbound waveguide 330 through a coupler 340 near the off-ramp segment 325-2" of the wavelength selective waveguide. FIG. 10 is another preferred embodiment similar to that shown in FIG. 7 except that the bus waveguide 310 is disposed along a vertical direction and an outbound waveguide 330 is disposed along a horizontal direction.

Figure 11:
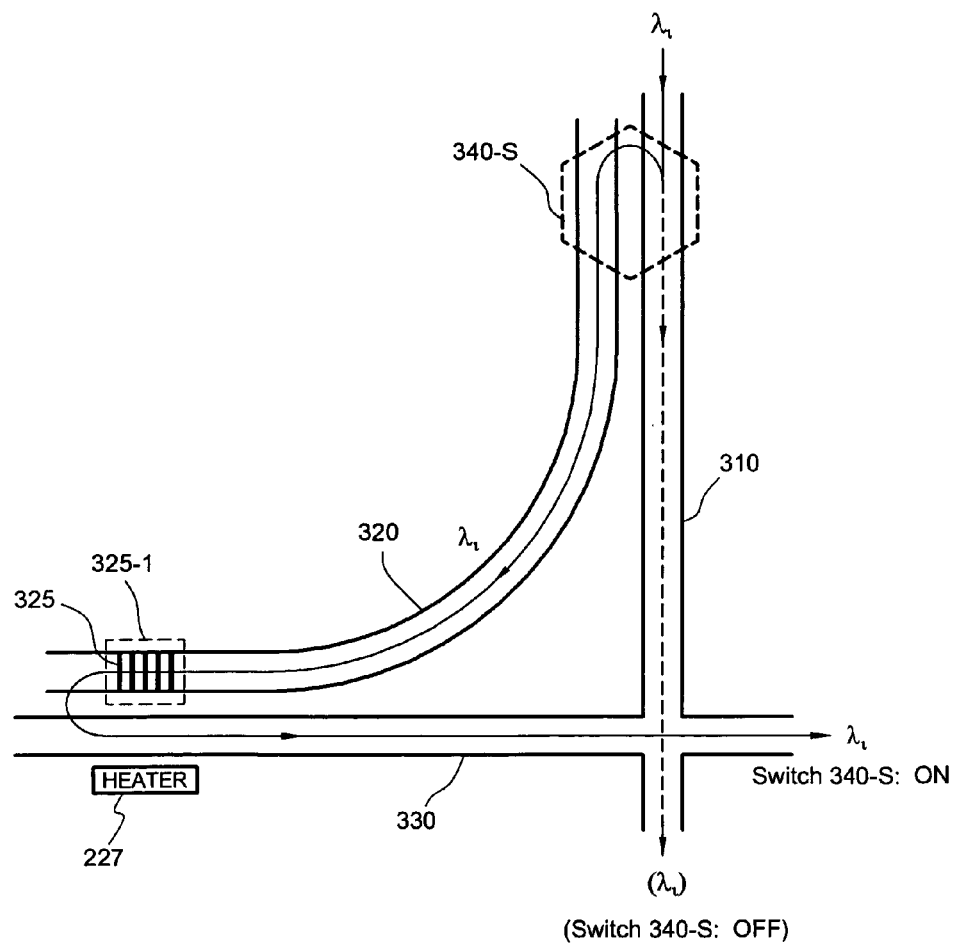

FIG. 11 shows a different embodiment of this invention with a wavelength selective waveguide 320 coupled between a bus waveguide 310 and an intersecting waveguide 330. An optical signal $\lambda_i$ is transmitted in a bus waveguide 310. The wavelength selective waveguide 320 has a first end coupled to the bus waveguide 310 via an optical switch 340-S. The optical switch 340-S is controlled to transmit the optical signal to continue along the bus waveguide 310 or to switch the optical signal to transmit to the waveguide 320. The waveguide 320 has a second end 325-1 that has a Bragg grating 325 coupled to an intersecting waveguide 330. The Bragg grating 325 is coupled to the intersecting waveguide 330 for wavelength selectively projecting an optical signal with wavelength $\lambda_i$ as an output optical signal from the intersecting waveguide 330. The optical switch 340-S disposed on the first end of the waveguide 320 for coupling to the bus waveguide 310 can be a thermal, mechanical, electro-optical, micro electromechanical system (MEMS), liquid crystal, etc. Further, a heater 227 is placed proximate to the second end 325-1 for selectively activating or adjusting the coupling operation.

The heater 227 may be any device that can generate thermal energy. As noted above, the present invention may also be adapted to replace the heaters 227 with cooling elements. The operative aspect is that some element capable of changing the temperature of the coupling zone is present. Thus, a more generic element that can replace the heater 227 may be any device or method for changing the temperature of the coupling zone, i.e. a "temperature changing element". With current technology, a heater may be more easily implemented than a cooling element. For example, a simple resistive style heater may be used whereby heat is generated by running current through a resistive (or other impedance) element.

Note that the Figures depict an input waveguide that carries a multitude of wavelengths: $\lambda_1, \lambda_2, \lambda_3, \ldots, \lambda_n$. In order to turn "off" coupling of the nominal wavelength $\lambda_i$, the heater 227 need only change the temperature by an amount necessary to implement a sufficient Bragg wavelength shift. However, because the input waveguide carries a multitude of wavelengths, the Bragg wavelength shift may simply cause the Bragg grating to couple a different wavelength, such as $\lambda_{i+1}$. Therefore, in a situation where multiple wavelengths are being carried, the temperature change, and thus the Bragg wavelength shift, should be sufficient to be outside of all of the multiple wavelengths. Of course, if only a single wavelength is being carried, the temperature shift may be much less and still turn "off" the coupling.

The present invention may take advantage of the thermally induced Bragg wavelength shift to "tune" a Bragg grating to couple a desired wavelength. Thus, by applying the appropriate amount of thermal energy, the wavelength to be coupled by the Bragg grating may be selected, much like a radio tuner.

Moreover, the embodiments shown in FIGS. 4–10 utilize an input waveguide, and output waveguide, and a "bridging" waveguide. In order to turn off the bridging waveguide, only one of the Bragg gratings need to be thermally energized to turn off the coupling effect of the Bragg grating.

Although the present invention has been described in terms of the presently preferred embodiment, it is to be understood that such disclosure is not to be interpreted as limiting. For example, although the present invention has been described in terms of a waveguide, as that term is used herein, waveguide is intended to include all types of optical fiber and optical propagation medium. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A wavelength selective switch comprising:
   an input waveguide for carrying an optical signal having a wavelength $\lambda_i$;
   an output waveguide having a Bragg grating adapted for coupling said wavelength $\lambda_i$ into said output waveguide, said output waveguide disposed proximate to said input waveguide such that coupling of said wavelength $\lambda_i$ may occur in a coupling zone; and
   a heater element that can selectively provide thermal energy to said coupling zone such that said Bragg grating does not couple said wavelength $\lambda_i$.

2. The switch of claim 1 wherein said heater element is a resistive heater.

3. The switch of claim 1 wherein said input waveguide carries a plurality of wavelengths in addition to said wavelength $\lambda_i$ and further wherein said heater element can selectively deliver thermal energy to said coupling zone so as to selectively cause said Bragg grating to couple one of said plurality of wavelengths.

4. A wavelength selective switch comprising:
   an input waveguide for carrying an optical signal having a wavelength $\lambda_i$;
   an output waveguide having a Bragg grating adapted for coupling said wavelength $\lambda_i$ into said output waveguide, said output waveguide disposed proximate to said input waveguide such that coupling of said wavelength $\lambda_i$ may occur in a coupling zone; and
   means for heating that can selectively provide thermal energy to said coupling zone such that said Bragg grating does not couple said wavelength $\lambda_i$.

5. The switch of claim 4 wherein said means for heating is a resistive heater.

6. The switch of claim 4 wherein said input waveguide carries a plurality of wavelengths in addition to said wavelength $\lambda_i$ and further wherein said means for heating can selectively deliver thermal energy to said coupling zone so as to selectively cause said Bragg grating to couple one of said plurality of wavelengths.

7. A wavelength selective switch comprising:
   an input waveguide for carrying an optical signal having a wavelength $\lambda_i$;
   an output waveguide having a Bragg grating adapted for coupling said wavelength $\lambda_i$ into said output waveguide, said output waveguide disposed proximate to said input waveguide such that coupling of said wavelength $\lambda_i$ may occur in a coupling zone; and
   a cooling element that can selectively provide cooling to said coupling zone such that said Bragg grating does not couple said wavelength $\lambda_i$.

8. The switch of claim 7 wherein said input waveguide carries a plurality of wavelengths in addition to said wavelength $\lambda_i$ and further wherein said cooling element can selectively cool said coupling zone so as to selectively cause said Bragg grating to couple one of said plurality of wavelengths.

9. A wavelength selective switch comprising:
   an input waveguide for carrying an optical signal having a wavelength $\lambda_i$;
   an output waveguide having a Bragg grating and disposed proximate to said input waveguide in a coupling zone, said Bragg grating not coupling said wavelength $\lambda_i$; and
   a heater element that can selectively provide thermal energy to said coupling zone such that said Bragg grating couples said wavelength $\lambda_i$.

10. The switch of claim 9 wherein said heater element is a resistive heater.

11. A wavelength selective switch comprising:
    an input waveguide for carrying an optical signal having a wavelength $\lambda_i$;
    an output waveguide having a Bragg grating and disposed proximate to said input waveguide in a coupling zone, said Bragg grating not coupling said wavelength $\lambda_i$; and
    a cooling element that can cool said coupling zone such that said Bragg grating couples said wavelength $\lambda_i$.

12. A wavelength-selective switch comprising:
    an input waveguide extending over a first direction and carrying an optical signal of wavelength $\lambda_i$;
    an output waveguide intersecting with said input waveguide at an intersection;
    a bridge waveguide switch disposed on said intersection, said bridge waveguide having a Bragg grating adapted for coupling said wavelength $\lambda_i$; and
    a heater element that can selectively provide thermal energy to said intersection such that said Bragg grating does not couple said wavelength $\lambda_i$.

13. The switch of claim 12 wherein said input waveguide and said output waveguide are substantially perpendicular to each other.

14. A wavelength-selective switch comprising:
    an input waveguide extending over a first direction and carrying an optical signal of wavelength $\lambda_i$;
    an output waveguide intersecting with said input waveguide at an intersection;
    a bridge waveguide switch disposed on said intersection, said bridge waveguide having a Bragg grating adapted for coupling said wavelength $\lambda_i$; and
    a cooling element that can selectively cool said intersection such that said Bragg grating does not couple said wavelength $\lambda_i$.

15. The switch of claim 14 wherein said input waveguide and said output waveguide are substantially perpendicular to each other.

16. A wavelength-selective switch comprising:
    an input waveguide extending over a first direction and carrying an optical signal of wavelength $\lambda_i$;
    an output waveguide extending next to said input waveguide;
    a bridge waveguide switch disposed between said input waveguide and output waveguide, said bridge waveguide having a Bragg grating adapted for coupling said wavelength $\lambda_i$; and
    a heater element that can selectively provide thermal energy to said intersection such that said Bragg grating does not couple said wavelength $\lambda_i$.

17. A wavelength-selective switch comprising:
    an input waveguide extending over a first direction and carrying an optical signal of wavelength $\lambda_i$;
    an output waveguide extending next to said input waveguide;
    a bridge waveguide switch disposed between said input waveguide and output waveguide, said bridge waveguide having a Bragg grating adapted for coupling said wavelength $\lambda_i$; and
    a cooling element that can selectively cool said intersection such that said Bragg grating does not couple said wavelength $\lambda_i$.

* * * * *